(12) United States Patent
Hardy et al.

(10) Patent No.: US 10,223,220 B2
(45) Date of Patent: Mar. 5, 2019

(54) PROCESSING A HEALTH CONDITION MESSAGE ON A HEALTH CONDITION TO DETERMINE WHETHER TO PERFORM A SWAP OPERATION

(71) Applicant: INTERNATIONAL BUSINESS MACHINES CORPORATION, Armonk, NY (US)

(72) Inventors: Clint A. Hardy, Tucson, AZ (US); Matthew J. Kalos, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/292,701

(22) Filed: Oct. 13, 2016

(65) Prior Publication Data
US 2018/0107570 A1   Apr. 19, 2018

(51) Int. Cl.
| G06F 11/00 | (2006.01) |
| G06F 11/20 | (2006.01) |
| G06F 11/07 | (2006.01) |
| G06F 11/16 | (2006.01) |

(52) U.S. Cl.
CPC ...... *G06F 11/2033* (2013.01); *G06F 11/0727* (2013.01); *G06F 11/0757* (2013.01); *G06F 11/16* (2013.01); *G06F 11/2007* (2013.01); *G06F 2201/85* (2013.01)

(58) Field of Classification Search
USPC ...................................................... 714/4.12
See application file for complete search history.

(56) References Cited

U.S. PATENT DOCUMENTS

| 5,928,367 A | 7/1999 | Nelson et al. |
| 7,085,956 B2 | 8/2006 | Petersen et al. |
| 7,139,851 B2 | 11/2006 | Fujibayashi |
| 7,360,044 B2 | 4/2008 | Cochran et al. |
| 9,563,512 B1 | 2/2017 | Hardy et al. |
| 2008/0307271 A1* | 12/2008 | Nakajima ............. G06F 3/0605 714/47.2 |

(Continued)

OTHER PUBLICATIONS

J.L. Craft, et al., "Automatic Swap of the Primary and Secondary Mirrors in a Disk Mirror System", ip.com, TDB v36 n12, IP.com No. 000106649, Mar. 21, 2005, pp. 85-86.

(Continued)

*Primary Examiner* — Sarai E Butler
(74) *Attorney, Agent, or Firm* — David W. Victor; Konrad Raynes Davda & Victor LLP

(57) ABSTRACT

Provided are a computer program product, system, and method for processing a health condition message on a health condition to determine whether to perform a swap operation. A health condition message is received from a first server indicating an estimated Input/Output (I/O) delay to access a first storage resulting from a health condition experienced at the first server. A determination is made as to whether the estimated I/O delay exceeds a threshold response time for the first storage. A swap operation is performed to redirect I/O requests to data from the first server to the second server to access the data at the second storage in response to determining that the estimated I/O delay exceeds the threshold response time.

25 Claims, 6 Drawing Sheets

(56) References Cited

U.S. PATENT DOCUMENTS

| | | | | |
|---|---|---|---|---|
| 2013/0238930 A1* | 9/2013 | Umbehocker | ...... | G06F 11/2092 |
| | | | | 714/6.32 |
| 2015/0347245 A1* | 12/2015 | Andre | .................. | G06F 11/203 |
| | | | | 714/6.3 |
| 2016/0092292 A1* | 3/2016 | Lv | ........................ | G06F 11/079 |
| | | | | 714/37 |
| 2018/0074881 A1* | 3/2018 | Burden | ............... | G06F 11/0754 |
| 2018/0107566 A1 | 4/2018 | Hardy et al. | | |

OTHER PUBLICATIONS

"Method to Swap Data Bytes in Memory Mirroring to Minimize DRAM Level Failure Impacts", ip.com, IP.com No. 000229439, Jul. 30, 2013, pp. 5.

List of Patents or Patent Applications Treated as Related, dated Oct. 13, 2016, pp. 2.

U.S. Appl. No. 15/292,677, filed Oct. 13, 2016.

U.S. Appl. No. 15/187,369, filed Jun. 20, 2016.

U.S. Appl. No. 15/187,388, filed Jun. 20, 2016.

Office Action dated Jun. 20, 2018, pp. 28 for U.S. Appl. No. 15/292,677, filed Oct. 13, 2016.

Response dated Sep. 20, 2018, pp. 12, to Office Action dated Jun. 20, 2018, pp. 28 for U.S. Appl. No. 15/292,677.

Notice of Allowance dated Oct. 31, 2018, pp. 9, for U.S. Appl. No. 15/292,677.

* cited by examiner

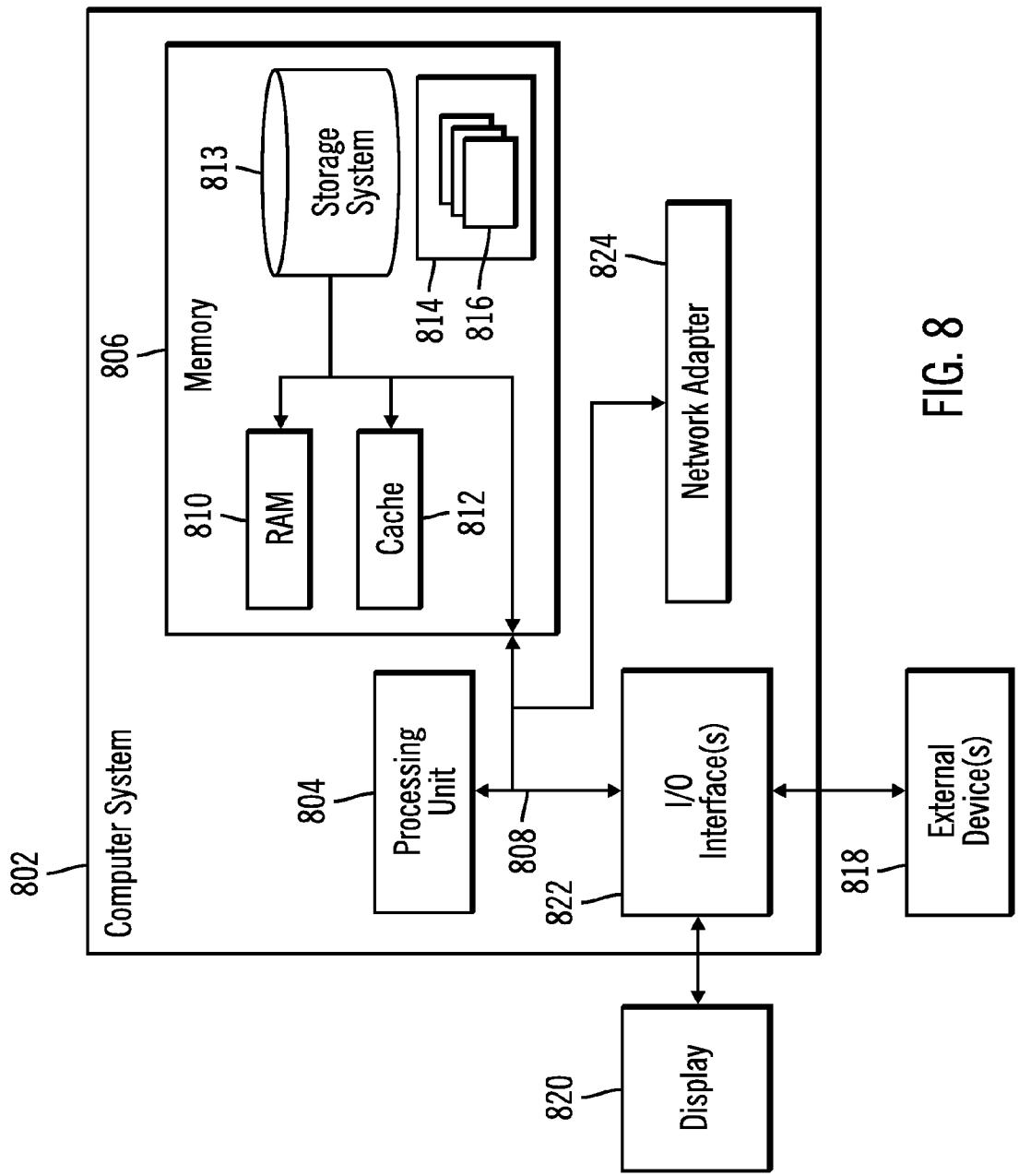

PROCESSING A HEALTH CONDITION MESSAGE ON A HEALTH CONDITION TO DETERMINE WHETHER TO PERFORM A SWAP OPERATION

BACKGROUND OF THE INVENTION

1. Field of the Invention

The present invention relates to a computer program product, system, and method for processing a health condition message on a health condition to determine whether to perform a swap operation.

2. Description of the Related Art

In a storage environment, primary and secondary storage servers may maintain mirror copy relationships, where a primary volume in a mirror copy relationship comprises the storage or volumes from which data is physically copied to a secondary volume. Swapping programs, such as International Business Machine Corporation's ("IBM") Hyper-Swap® which is a function in the z/OS® operating system, provides continuous availability for disk failures by maintaining the mirror copy relationships to provide synchronous copies of all primary disk volumes on one or more primary storage systems to one or more target (or secondary) storage systems. (HyperSwap and z/OS are registered trademarks of IBM in countries throughout the world). When a disk failure is detected, code in the operating system identifies Hyper-Swap managed volumes and instead of failing the I/O request, HyperSwap switches (or swaps) information in internal control blocks so that the I/O request is driven against the secondary volume of the mirror copy relationship. Since the secondary volume is an identical copy of the primary volume prior to the failure, the I/O request will succeed with no impact to the program issuing the I/O request, which could be an application program or part of the operating system. This therefore masks the disk failure from the program and avoids an application and/or system outage. (IBM, HyperSwap, and z/OS are registered trademarks of IBM in many countries).

Storage controllers may raise signals to alert the host system of error conditions, referred to as storage controller health messages. These health messages can be raised during controller recovery actions, internal control block rebuild actions or severe error conditions. These types of conditions may indicate that the controller either cannot service Input/Output (I/O) requests or will be delayed in servicing I/O requests. For temporary conditions, additional storage controller health messages may be raised to signal the condition being resolved.

When HyperSwap is enabled and certain types of storage controller health messages are received indicating health conditions on the primary server, HyperSwap may react to the health message as a swap trigger and initiate a Hyper-Swap to redirect I/O requests to the secondary system and break a synchronous copy relationship between the primary and secondary servers so data is no longer mirrored from the primary server having the health condition to the secondary server, now operating as the primary server as a result of the HyperSwap.

There is a need in the art for improved techniques for generating and processing health condition messages from servers in a mirror copy relationship with swapping capabilities.

SUMMARY

Provided are a computer program product, system, and method for processing a health condition message on a health condition to determine whether to perform a swap operation. A health condition message is received from a first server indicating an estimated Input/Output (I/O) delay to access a first storage resulting from a health condition experienced at the first server. A determination is made as to whether the estimated I/O delay exceeds a threshold response time for the first storage. A swap operation is performed to redirect I/O requests to data from the first server to the second server to access the data at the second storage in response to determining that the estimated I/O delay exceeds the threshold response time.

Providing an estimated I/O delay with a health condition message to a host system allows the host system to determine whether the delay exceeds quality of service and other thresholds tolerated by the host system. The host system may then use the estimated I/O delay to determine whether the wait is beyond a tolerable threshold to warrant directing I/O requests to the second server and second storage providing a mirror copy of the data at the first storage.

In a further embodiment, the health condition message includes a flag indicating whether the health condition message includes an estimated I/O delay. The determining whether the estimated I/O delay exceeds the threshold response time exceeds the threshold is performed in response to determining that the flag indicating whether the estimated I/O delay is included in the health condition message.

The flag is used to indicate to the host system that an estimated I/O delay is included in the health condition message to consider when determining whether to redirect I/O requests to the second storage. The flag optimizes host system processing by providing the host system information on whether to determine whether to swap based on an estimated I/O delay or other factors.

In a further embodiment, the health condition message further includes a health status indicating one of a plurality of health status levels. A determination is made as to whether the health status indicates to perform the swap operation in response to determining that the flag indicates that the health condition message does not include the estimated I/O delay. The swap operation is performed in response to determining that the health status indicates to perform the swap operation.

Including a health status level provides further information for the host system to use to determine whether the health status level is associated with an unacceptable delay such that a swap operation should be performed to redirect I/O requests to the second storage. The health status level may be considered with the estimated I/O delay when included in the health condition message or considered alone when the health condition message does not provide an estimated I/O delay.

In a further embodiment, the health condition message indicates a volume that is expected to experience the estimated I/O delay. A data structure indicates for each of a plurality of volumes a threshold response time, wherein different threshold response times are provided for at least two of the volumes indicated in the data structure. A determination is made from the data structure of the threshold response time for the volume indicated in the health condition message.

In a further embodiment, the volume indicated in the health condition message comprises a first volume, wherein the swap operation is performed with respect to the first volume indicated in the health condition message to direct I/O requests for the first volume indicated to the second server. Prior to receiving the health condition message, I/O requests for a second volume not indicated in the health condition message are directed to the first server, wherein I/O requests to the second volume continue to be directed to the first server after completing processing the health condition message and while I/O requests are being redirected to the second server.

By including information on which volumes are affected by the health condition, the host system may perform the swap operations with respect to those volumes experiencing the error triggering the health condition message and may continue to direct I/O requests to volumes not experiencing the error to the first storage. Limiting the swap operation to only those volumes experiencing the errors avoids any delays and extra-processing operations required to implement the swap operation for those volumes in the first storage not experiencing the error which do not need to be included in the swap operation for the host system to avoid undue delays.

BRIEF DESCRIPTION OF THE DRAWINGS

FIG. 8 illustrates an embodiment of a computer architecture used with described embodiments.

DETAILED DESCRIPTION

Described embodiments provide techniques for a host server to determine an estimated I/O delay associated with a health condition to include in a health condition message. The host system receiving the health condition message may use the estimated I/O delay to determine if a response time threshold is satisfied, such as for a volume indicated in the health condition message, to perform a swap operation to direct I/O requests to a secondary server mirroring the primary server that sent the health condition message if the estimated I/O delay exceeds the response time threshold. This allows the host system to set response time thresholds for different data and volumes based on the latency requirements to access the data, so that data requiring immediate access, low latency, has a lower estimated I/O delay because longer delays for such data will not be tolerated, thus causing the swap operation earlier. However, data in volumes that is not of high importance or tolerating a high latency, may have a higher estimated I/O delay because applications requesting the data can tolerate a longer estimated I/O delay so that a swap operation is not needed as soon as for data in volumes having a low latency requirement.

Figure 1:
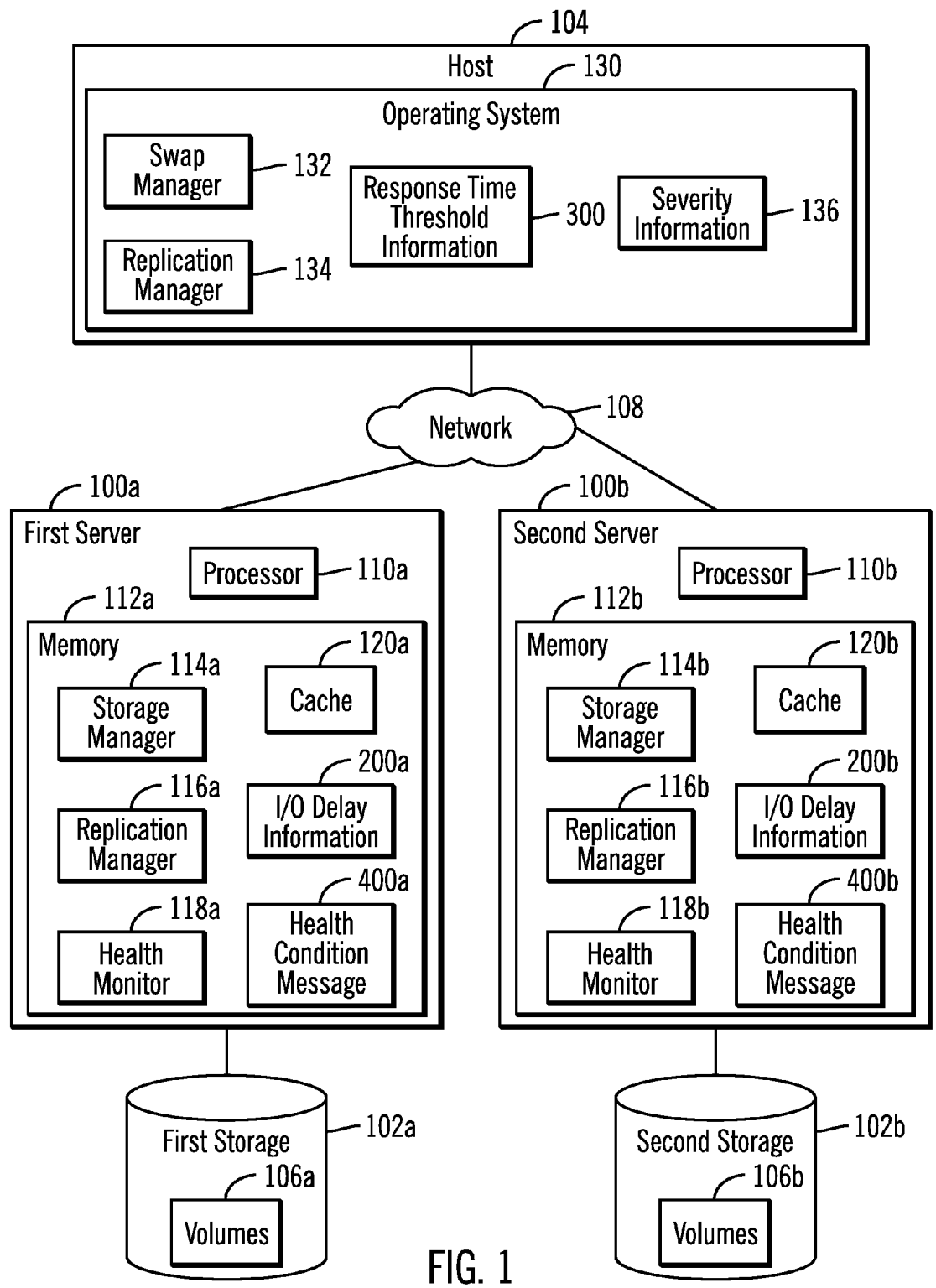
FIG. 1 illustrates an embodiment of a storage environment.

FIG. 1 illustrates a storage environment having a first server 100a and a second server 100b that manage a first storage 102a and a second storage 102b, respectively. A host 104 may access volumes 106a and 106b in the first storage 102a and the second storage 102b, respectively, over a network 108. The primary server 100a and the secondary server 100b may also communicate over the network 108 or a separate network or interface. The volumes 106a, 106b may comprise a Logical Unit Number (LUN), Logical Subsystem (LSS), or any grouping of tracks, where a track may comprise a block, track or any data unit.

Each server 100a, 100b includes a processor 110a, 110b, comprising one or more processor devices, and a memory 112a, 112b. Each memory 112a, 112b includes a storage manager 114a, 114b to manage read and write access to the respective storage 102a, 102b from the host 104; a replication manager 116a, 116b to replicate data between the servers 100a, 100b; a health monitor 118a, 118b to monitor the health of components in the servers 100a, 100b and generate a health condition message 400a, 400b indicating a health condition detected by the health monitor 118a, 118b; I/O delay information 200a, 200b indicating estimated I/O delays for different detected health conditions; and a cache 120a, 120b to cache read and write data with respect to the volumes 106a, 106b in the respective primary 102a and secondary 102b storages.

The host 104 includes an operating system 130 having a swap manager 132 to manage a swap from one of the servers 100a, 100b acting as a primary server, to the other server 100b, 100a, respectively, acting as the secondary server; a replication manager 134 to manage replication or mirror copy operations between the servers 100a, 100b; response time threshold information 300 providing a threshold to use to determine whether to swap, where there may be one response time threshold to use for all health condition messages or a table of a response time threshold for each of the volumes 106a the host 104 is accessing; and severity information 136 indicating for different severity levels whether a swap is to be performed to redirect I/O access from a server 100a, 100b designated as a primary server to the other server 100b, 100a designated as a secondary server.

The host 104 may direct Input/Output (I/O) requests to a first server 100a, functioning as a primary server, to access tracks from the first storage 102a. In such case, the first replication manager 116a would initially copy all volumes 106a being replicated to volumes 106b in the second storage 102b, functioning as a secondary storage, and then upon receiving an update to a volume 106a, transfer that updated track to the second server 100b to store in the second storage 102b. In the event the host 104 detects that the one or more of the volumes 106a are unavailable, due to a planned or unplanned event, the host swap manager 132 initiates a swap from one or more of the volumes 106a, including those that are now unavailable, to the corresponding volumes 106b managed by the secondary server 100b, so that all host 104 I/O access is redirected to the secondary server 100b and secondary volumes 106b that are swapped. Either server 100a, 100b may operate as the primary server to which host 104 I/O access is directed and the secondary server to which data is mirrored. Either server 100a, 100b may function as the primary server and the secondary server.

In one embodiment, when detecting unavailability of a subset of the volumes 106a, i.e., less than all of the volumes 106a, only the unavailable volumes 106a may be subject to a swap, where those primary volumes 106a still available may not be swapped. In this way, I/O requests can continue to the available volumes 106a and be redirected for the unavailable volumes to the secondary volumes 106b. In an alternative embodiment, all of the volumes 106a may be swapped to the secondary volumes 106b even if just a subset of the volumes 106a are unavailable.

In certain embodiments, the host operating system 130 may comprise an operating system such as z Systems Operating System (z/OS®) from International Business Machines Corporation ("IBM") or other operating systems known in the art. (z/OS is a registered trademark of IBM throughout the world). The host swap manager 132 may comprise IBM's HyperSwap® program or other similar swapping programs by other vendors. The servers 100a and 100b may comprise an enterprise storage server suitable for managing access to attached or integrated storage devices, such as the IBM DS8000® storage system. (z/OS, HYPER-SWAP, and DS8000 are registered trademarks of IBM in countries throughout the world).

A swap operation from one server to another comprises any operation which redirects host 104 access from one server and storage pair to the other server and storage pair to provide hosts 104 continual access to data, whether it be accessed from the primary storage 102a or the secondary storage 102b. In this way, the swap operation allows for continued, minimally interrupted access to storage.

The network 108 may comprise a Storage Area Network (SAN), Wide Area Network (WAN), Local Area Network (LAN), the Internet, and Intranet, a wireless network, wired network, etc. Additionally, the servers 100a, 100b may communicate over another interface, such as a bus or other network, including a Peripheral Component Interconnect Express (PCIe) bus.

The storages 102a, 102b may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The volumes 106a, 106b may further be configured from an array of devices, such as Just a Bunch of Disks (JBOD), Direct Access Storage Device (DASD), Redundant Array of Independent Disks (RAID) array, virtualization device, etc. Further, the storages 102a, 102b may comprise heterogeneous storage devices from different vendors and different types of storage devices, such as a first type of storage devices, e.g., hard disk drives, that have a slower data transfer rate than a second type of storage devices, e.g., SSDs.

The components, such as the swap manager 132, replication manager 134, storage manager 114a, 114b, replication manager 116a, 116b, and health monitor 118a, 118b may be implemented in computer readable program instructions in a computer readable storage medium executed by a processor and/or computer hardware, such as an Application Specific Integrated Circuit (ASIC).

Figure 2:
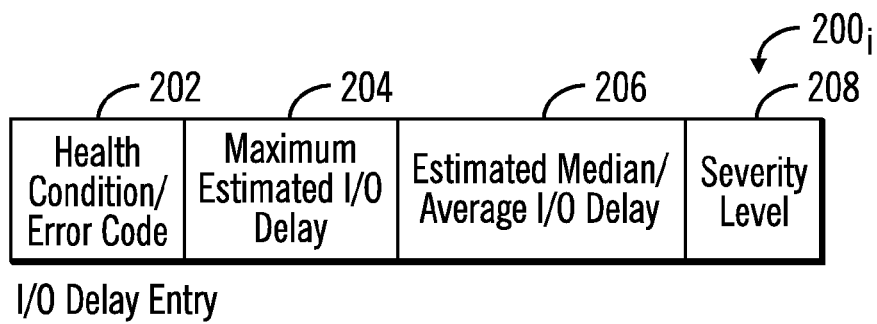
FIG. 2 illustrates an embodiment of an Input/Output delay ("I/O") entry providing information on an estimated I/O delay parameters for health conditions.

FIG. 2 illustrates an embodiment of an I/O delay entry $200_i$ maintained in the I/O delay information 200a, 200b in the servers 100a, 100b, respectively, to process detected health conditions, and includes a health condition/error code 202 detected by the health monitor 118a, 118b; a maximum estimated I/O delay 204 a host I/O access is expected to experience for the specific health condition 202; an estimated median/average I/O delay 206 a host is expected to experience; and a severity level 208 of the health condition, such as acute, minor, severe, etc. Alternatively, additional estimated I/O delay information may be included or only one delay parameter may be provided, such as a median/average or other estimated I/O delay.

The health condition 202 may comprise a hardware error in the primary server 100a, 100b or storage 102a, 102b that is resolved by fixing or replacing the hardware, a hardware or data error in the primary storage 1002, 102b, an error in a device or host adaptor in the primary server 100a, 100b, and other software and/or hardware errors, etc.

The severity level 208 may be used to determine whether to initiate a swap operation. For instance, an acute message which may trigger a swap, may be sent for reasons such as the server 100a, 100b is going through a recovery procedure, during which data is unavailable to be read and/or written, or it may indicate a data loss condition. In the case of a recovery procedure, an acute condition may be indicated when the health condition is a non-retryable or retryable software (firmware) error requiring a recovery procedure, such as restarting the failed component for a retry-able error, that will interrupt host I/O access to the primary server and take more time to complete than the time required for the swap operation, such that data would be inaccessible for less time if the swap was performed.

The health monitor 118a, 118b may dynamically update the estimated I/O delay parameters 204, 206 in I/O delay entries $200_i$ based on empirical I/O delays observed at the server 100a, 100b during a beginning and end of health conditions. The health monitor 118a, 118b may periodically adjust the estimated I/O delay parameters 204, 206 or dynamically adjust after each noted health condition occurrence resulting in an I/O delay.

Figure 3:
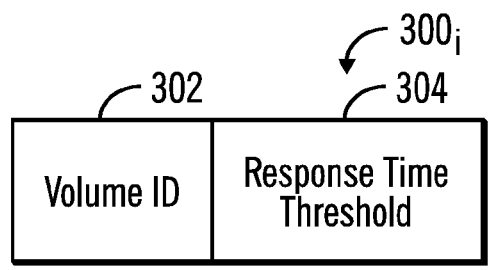
FIG. 3 illustrates an embodiment of response time thresholds for volumes.

FIG. 3 illustrates an embodiment of a response time threshold entry 300, maintained in the response time threshold information 300, and includes a volume identifier (ID) 302 and a corresponding response time threshold 304 when the volume 302 is subject to the estimated I/O delay resulting from the health condition. The response time threshold 304 may be based on the degree to which the data stored in the volume 302 requires low latency or a higher quality of service, such as for critical database data, production data, or data needed for critical application data. For instance, a volume 302 having data having low latency or high quality of service requirement may have a lower response time threshold 304 indicating the unacceptability of the host 104 being subject to delays in accessing data in the volume 302. However, for data that does not require low latency, such as archived data, the response time threshold 304 may be higher. The response time threshold determines the duration or delay threshold for initiating a swap operation, such that a swap operation needs to be performed earlier for low latency data (a lower response time threshold), than high latency data (higher response time threshold).

Figure 4:
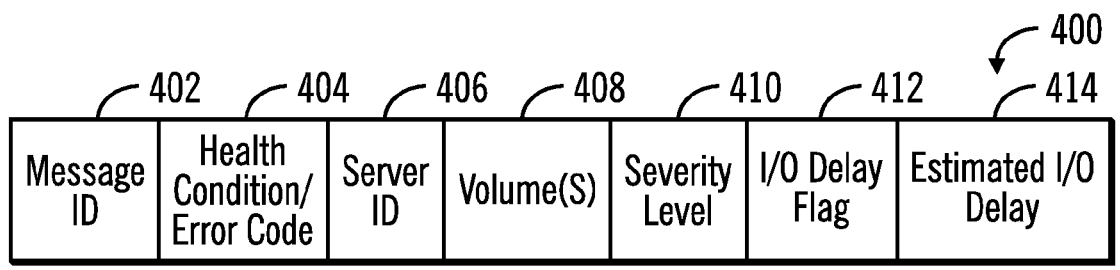
FIG. 4 illustrates an embodiment of a health condition message.

FIG. 4 illustrates an embodiment of a health condition message 400 generated by the health monitor 118a, 118b upon detecting a health condition or error affecting access to the volumes 106a, 106b, and includes: a message identifier (ID) 402; a health condition or error code 404 indicating the type of error or health condition; a server ID 406 indicating the server 100a, 100b experiencing the health condition; one or more volumes 408 impacted by the health condition such that host access to the volume(s) 408 experiences delays due to the health condition 404; a severity level 410 of the health condition, e.g., minor, acute, severe, etc.; an I/O delay flag 412 indicating whether an estimated I/O delay 414 is provided, such as a single estimated I/O delay or multiple parameters, such as an estimated maximum I/O delay and an estimated mean/average I/O delay.

The host 104 may use the severity level 410 to determine whether to initiate a swap operation, where the severity information 136 indicates whether a swap operation is to be performed for a specific severity level. For instance, an acute message, which may trigger a swap, may be sent for reasons such as the server 100a, 100b is going through a recovery procedure, during which data is unavailable to be read and/or written, or it may indicate a data loss condition. In the case of a recovery procedure, an acute condition may be indicated when the health condition is a non-retryable or retryable software (firmware) error requiring a recovery procedure, such as restarting the failed component for a retryable error, that will interrupt host I/O access to the primary server and take more time to complete than the time required for the swap operation, such that data would be inaccessible for less time if the swap was performed.

Figure 5:
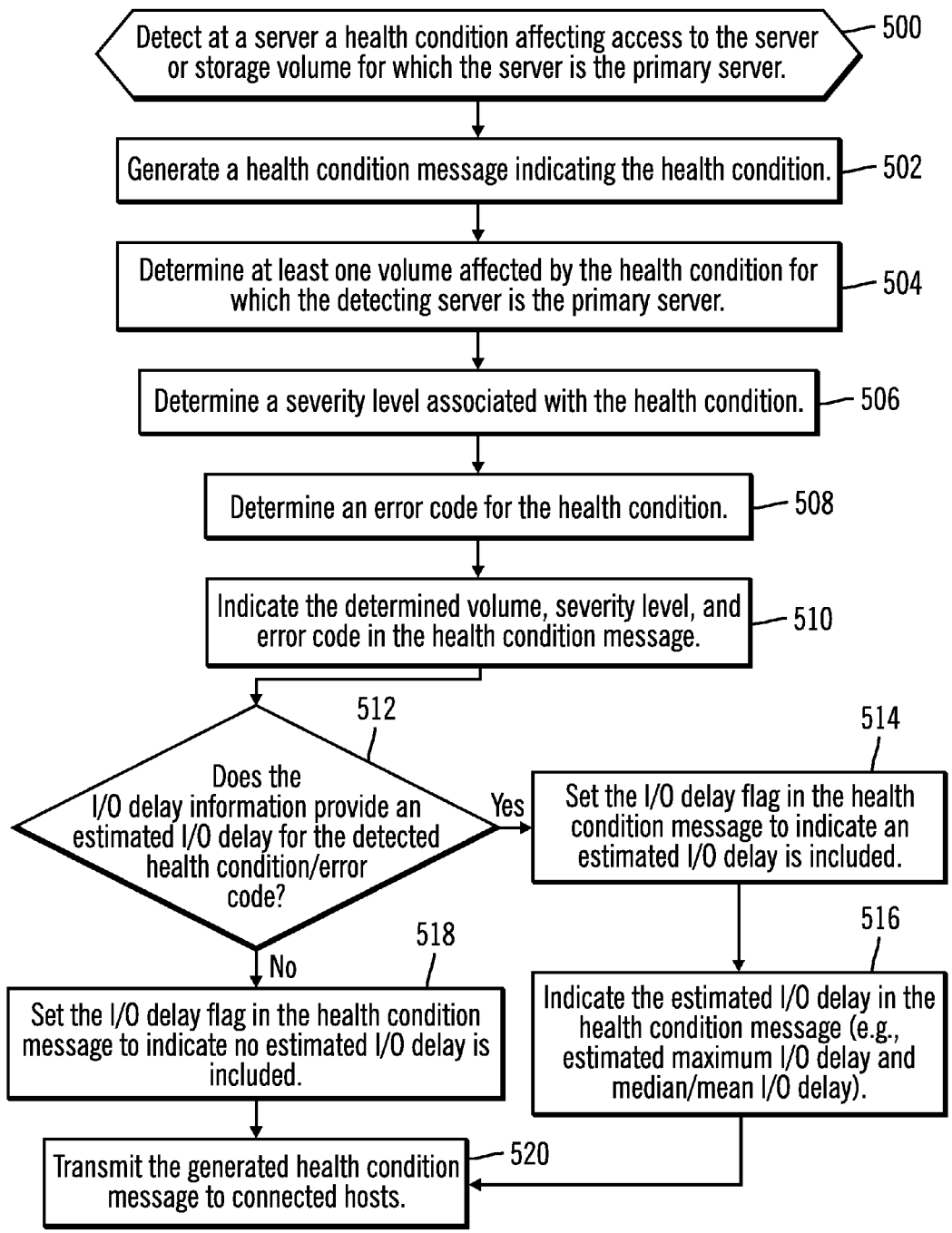
FIG. 5 illustrates an embodiment of operations for a server to generate a health condition message.

FIG. 5 illustrates an embodiment of operations to generate a health condition message 400 by the health monitor 118a, 118b in the server 100a, 100b operating as the primary server for one or more volumes affected by the detected health condition. Upon a server 100a, 100b detecting (at block 500) a health condition, such as an error, affecting access to the server 100a, 100b itself or a volume 106a, 106b for which the server 100a, 100b is acting as a primary server, the health monitor program 118a, 118b in the detecting server 100a, 100b generates (at block 502) a health condition message 400 indicating the health condition/error code 404. A determination is made (at block 504) of the one or more volumes 106a, 106b affected by the health condition for which the detecting server 100a, 100b is the primary server, a severity level associated with the health condition (at block 506), and an error code for the health condition (at block 508). The health monitor 118a, 118b indicates (at block 510) the determined at least one volume 106a, 106b, severity level corresponding to the health condition 404, and error code in fields 408, 410, and 404 of the health condition message 400. The health monitor 118a, 118b maintains information associating a severity level for each of the different detectable health conditions.

The health monitor 118a, 118b determines (at block 512) whether the I/O delay information 200a, 200b for the detecting server 100a, 100b includes an entry $200_i$ for the specific detected health condition/error code 202. If so, then the health monitor 118a, 188b in the detecting server 100a, 100b sets (at block 514) the I/O delay flag 412 in the health condition message 400 to indicate an estimated I/O delay 414 is included. The estimated I/O delay 204, 206 in the I/O delay entry $200_i$ for the detected health condition 202 is indicated (at block 516) in field 414 of the health condition message 400, which may indicate one estimated I/O delay or multiple I/O delay parameters, such as a maximum estimated I/O delay 204 and estimated median/average I/O delay. If (at block 512) there is no I/O delay entry $200_i$ in the I/O delay information 200a, 200b for the detected health condition, then the health monitor 118a, 118b in the detecting server 100a, 100b sets (at block 518) the I/O delay flag 412 in the health condition message 400 to indicate no estimated I/O delay is included. After generating the health condition message 400 (at block 518 or 516), the health monitor 118a, 118b transmits (at block 520) the generated health condition message 400 to one or more hosts 104 connected to the volume 106a, 106b affected by the health condition.

Figure 6:
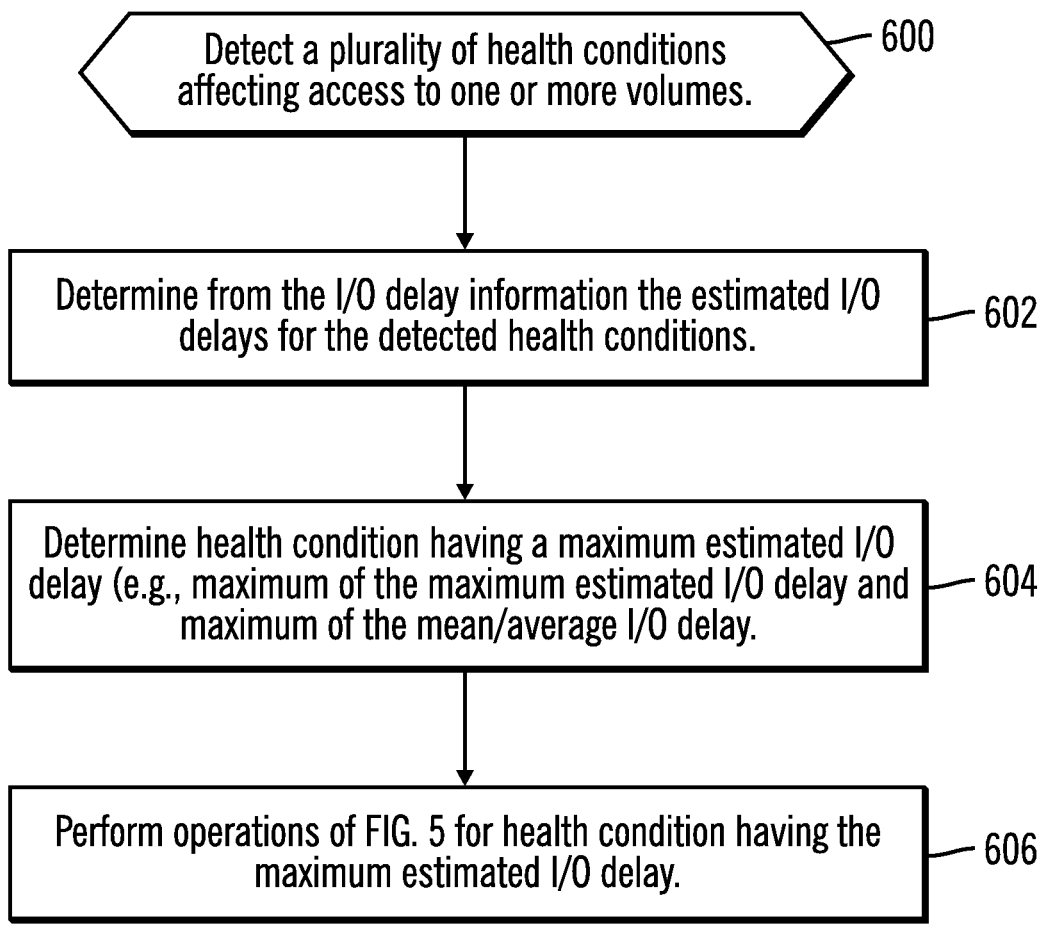
FIG. 6 illustrates an embodiment of operations for a server to process a plurality of health conditions.

FIG. 6 illustrates an embodiment of operations to generate a health condition message 400 by the health monitor 118a, 118b in the server 100a, 100b operating as the primary server for one or more volumes affected by a plurality of detected health conditions. Upon detecting (at 600) a plurality of health conditions affecting access to one or more volumes 106a, 106b for which the detecting server 100a, 100b is the primary server, the health monitor 118a, 118b determines (at block 602) from the I/O delay information 200a, 200b estimated I/O delays 204, 206 for the detected health conditions 202. A determination is made (at block 604) of the health condition having 202 a maximum estimated I/O delay, such as a maximum of the maximum estimated I/O delays 204 and/or maximum median/average I/O delays 206. The operations of FIG. 5 are performed (at block 606) with respect to the health condition having the maximum estimated I/O delay.

With the operations of FIG. 6, only one health condition is reported if multiple are detected, and the one that is reported comprises the health condition associated with a longest estimated I/O delay. In further embodiments, the determination may be made on a per volume basis, such that the maximum estimated I/O delay is determined for each volume, and the operations of FIG. 5 performed for an estimated I/O delay and volume pair, such that different health condition messages 400 indicting different maximum estimated I/O delays may be sent for different volumes, resulting in different swap decisions with respect to different of the volumes, so that access may be redirected for some volumes and not others for which the detecting server 100a, 100b comprises the primary server.

Figure 7:
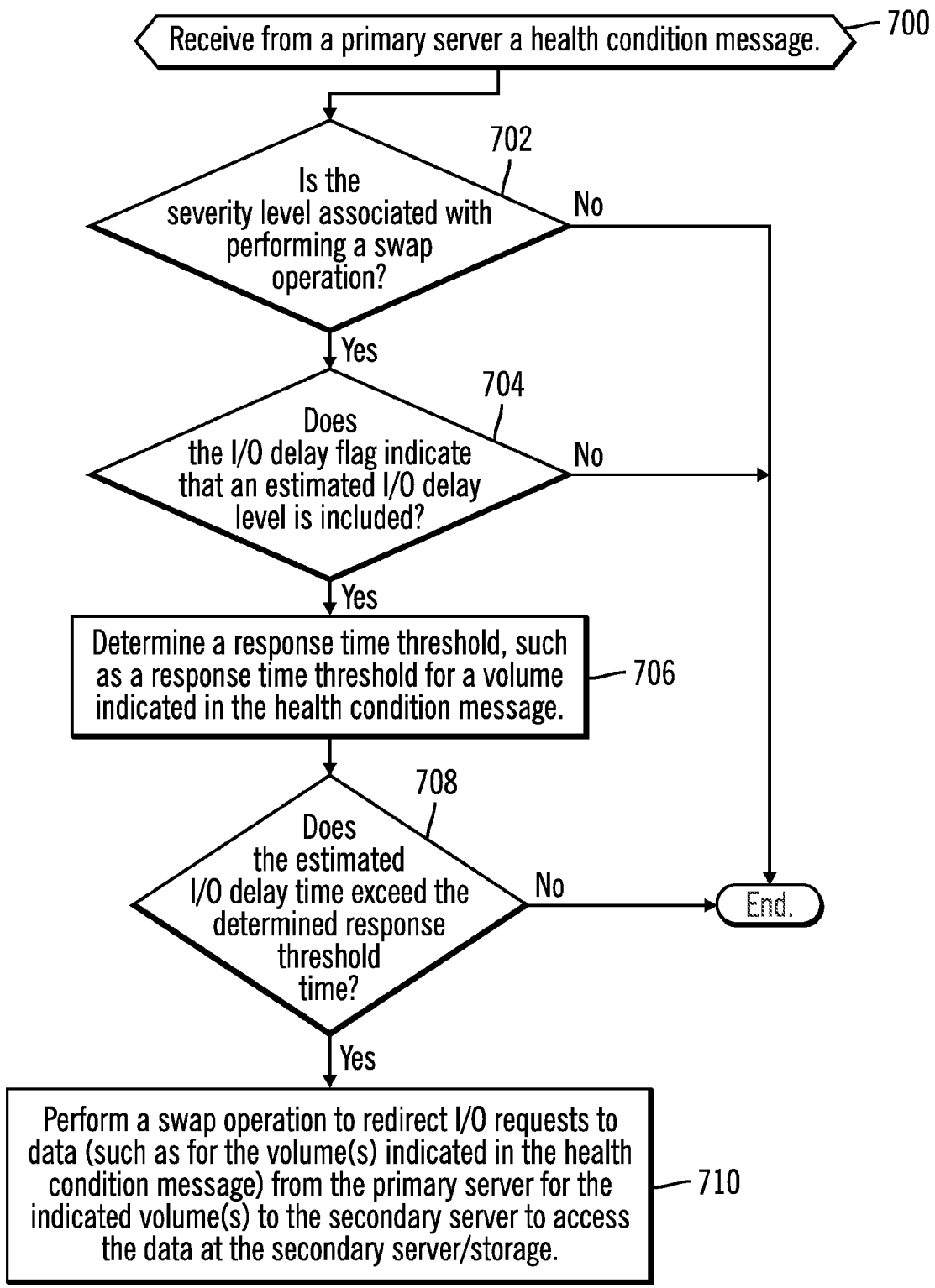
FIG. 7 illustrates an embodiment of operations for a host to process a health condition message.

FIG. 7 illustrates an embodiment of operations performed by the swap manager 132 in the host 104 to process a received health condition message 400 to determine whether to perform a swap operation to redirect I/O requests from one or more volumes from the primary server 100a, 100b sending the message 400 to the secondary server 100b, 100a. Upon receiving (at block 700) from a primary server 100a, 100b a health condition message 400, if (at block 702) the severity level is associated with performing a swap operation, then the swap manager 132 determines (at block 704) whether the I/O delay flag 412 indicates that an estimated I/O delay 414 is provided. If (at block 704) the I/O delay flag 412 indicates an estimated I/O delay 416 is provided, the swap manager 132 determines (at block 706) a response time threshold 304, such as a response time threshold 304 for a volume 408 indicated in the health condition message 400. If (at block 708) the estimated I/O delay time 414 exceeds the determined response time threshold 304, then the swap manager 132 performs (at block 710) a swap operation to redirect I/O requests to data (such as for the volume(s) 408 indicated in the health condition message) from the primary server 100a, 100b to the secondary server 100b, 100b operating as the primary server for the one or more volumes 408 indicated in the health condition message 400.

If (at block 702) the severity level is not associated with performing a swap operation, such as a severe or acute severity level, as opposed to a low severity where no swap is performed or if (at block 704) the I/O delay flag 412 indicates there is no estimated I/O delay 414 or if (at block 708) the estimated I/O delay 414, or multiple estimated delays, does not exceed the determined response time threshold 304, then control ends without performing a swap operation in response to the received health condition message and indicated volumes.

With the operations of FIG. 7, the host 104 swap manager 132 may perform the swap operation selectively for different volumes 106a, 106b, such that different health conditions and errors may result in the host 104 swapping and directing I/O access to different servers 100*a*, 100*b* for different of the volumes 106*a*, 106*b*.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIG. 1, including the servers 100*a*, 100*b*, and hosts 104 may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for processing a health condition message from a first server managing access to a first storage, wherein a second server manages access to a second storage, the computer program product comprising a computer readable storage medium having computer readable program code embodied therein that is executable to perform operations, the operations comprising:
   receiving from the first server a health condition message indicating an estimated Input/Output (I/O) delay to access the first storage resulting from a health condition experienced at the first server;
   determining whether the estimated I/O delay exceeds a threshold response time for the first storage, wherein the threshold response time is based on a latency requirement to access data; and
   performing a swap operation to redirect I/O requests to data from the first server to the second server to access the data at the second storage in response to determining that the estimated I/O delay exceeds the threshold response time, wherein a swap operation is not performed in response to determining that the estimated I/O delay in the health condition message does not exceed the threshold response time for the first storage.

2. The computer program product of claim 1, wherein the health condition message includes a flag indicating whether the health condition message includes an estimated I/O delay, wherein the determining whether the estimated I/O delay exceeds the threshold response time is performed in response to determining that the flag indicating whether the estimated I/O delay is included in the health condition message.

3. The computer program product of claim 2, wherein the health condition message further includes a health status indicating one of a plurality of health status levels, wherein the operations further comprise:
   determining whether the health status indicates to perform the swap operation in response to determining that the flag indicates that the health condition message does not include the estimated I/O delay; and
   performing the swap operation in response to determining that the health status indicates to perform the swap operation.

4. The computer program product of claim 1, wherein the health condition message indicates a volume that is expected to experience the estimated I/O delay, wherein the operations further comprise:
   maintaining a data structure indicating for each of a plurality of volumes a threshold response time, wherein different threshold response times are provided for at least two of the volumes indicated in the data structure; and
   determining from the data structure the threshold response time for the volume indicated in the health condition message.

5. The computer program product of claim 4, wherein the volume indicated in the health condition message comprises a first volume, wherein the swap operation is performed with respect to the first volume indicated in the health condition message to direct I/O requests for the first volume indicated to the second server, wherein prior to receiving the health condition message, I/O requests for a second volume not indicated in the health condition message are directed to the first server, wherein I/O requests to the second volume continue to be directed to the first server after completing processing the health condition message and while I/O requests are being redirected to the second server.

6. The computer program product of claim 1, wherein the estimated I/O delay indicates a maximum expected I/O disruption time and a median or average expected I/O delay, wherein determining whether the estimated I/O delay exceeds the threshold response time comprises determining whether the maximum expected I/O disruption time exceeds the threshold response time.

7. The computer program product of claim 6, wherein the operations further comprise:
   determining whether the median or average expected I/O delay exceeds an average threshold response time, wherein the swap operation is performed in response to determining that both the estimated I/O delay exceeds the threshold response time and the median or average expected I/O delay exceeds the average threshold response time.

8. A system for processing a health condition message from a first server managing access to a first storage, wherein a second server manages access to a second storage, comprising:
   a processor; and
   a computer readable storage medium having computer readable program code executed by the processor to perform operations, the operations comprising:
      receiving from the first server a health condition message indicating an estimated Input/Output (I/O) delay to access the first storage resulting from a health condition experienced at the first server;
      determining whether the estimated I/O delay exceeds a threshold response time for the first storage, wherein the threshold response time is based on a latency requirement to access data; and
      performing a swap operation to redirect I/O requests to data from the first server to the second server to access the data at the second storage in response to determining that the estimated I/O delay exceeds the threshold response time, wherein a swap operation is not performed in response to determining that the estimated I/O delay in the health condition message does not exceed the threshold response time for the first storage.

9. The system of claim 8, wherein the health condition message includes a flag indicating whether the health condition message includes an estimated I/O delay, wherein the determining whether the estimated I/O delay exceeds the threshold response time is performed in response to determining that the flag indicating whether the estimated I/O delay is included in the health condition message.

10. The system of claim 9, wherein the health condition message further includes a health status indicating one of a plurality of health status levels, wherein the operations further comprise:
    determining whether the health status indicates to perform the swap operation in response to determining that the flag indicates that the health condition message does not include the estimated I/O delay; and
    performing the swap operation in response to determining that the health status indicates to perform the swap operation.

11. The system of claim 8, wherein the health condition message indicates a volume that is expected to experience the estimated I/O delay, wherein the operations further comprise:
  maintaining a data structure indicating for each of a plurality of volumes a threshold response time, wherein different threshold response times are provided for at least two of the volumes indicated in the data structure; and
  determining from the data structure the threshold response time for the volume indicated in the health condition message.

12. The system of claim 11, wherein the volume indicated in the health condition message comprises a first volume, wherein the swap operation is performed with respect to the first volume indicated in the health condition message to direct I/O requests for the first volume indicated to the second server, wherein prior to receiving the health condition message, I/O requests for a second volume not indicated in the health condition message are directed to the first server, wherein I/O requests to the second volume continue to be directed to the first server after completing processing the health condition message and while I/O requests are being redirected to the second server.

13. The system of claim 8, wherein the estimated I/O delay indicates a maximum expected I/O disruption time and a median or average expected I/O delay, wherein determining whether the estimated I/O delay exceeds the threshold response time comprises determining whether the maximum expected I/O disruption time exceeds the threshold response time.

14. The system of claim 13, wherein the operations further comprise:
  determining whether the median or average expected I/O delay exceeds an average threshold response time, wherein the swap operation is performed in response to determining that both the estimated I/O delay exceeds the threshold response time and the median or average expected I/O delay exceeds the average threshold response time.

15. A method for processing a health condition message from a first server managing access to a first storage, wherein a second server manages access to a second storage, comprising:
  receiving from the first server a health condition message indicating an estimated Input/Output (I/O) delay to access the first storage resulting from a health condition experienced at the first server;
  determining whether the estimated I/O delay exceeds a threshold response time for the first storage, wherein the threshold response time is based on a latency requirement to access data; and
  performing a swap operation to redirect I/O requests to data from the first server to the second server to access the data at the second storage in response to determining that the estimated I/O delay exceeds the threshold response time, wherein a swap operation is not performed in response to determining that the estimated I/O delay in the health condition message does not exceed the threshold response time for the first storage.

16. The method of claim 15, wherein the health condition message includes a flag indicating whether the health condition message includes an estimated I/O delay, wherein the determining whether the estimated I/O delay exceeds the threshold response time is performed in response to determining that the flag indicating whether the estimated I/O delay is included in the health condition message.

17. The method of claim 16, wherein the health condition message further includes a health status indicating one of a plurality of health status levels, further comprising:
  determining whether the health status indicates to perform the swap operation in response to determining that the flag indicates that the health condition message does not include the estimated I/O delay; and
  performing the swap operation in response to determining that the health status indicates to perform the swap operation.

18. The method of claim 15, wherein the health condition message indicates a volume that is expected to experience the estimated I/O delay, further comprising:
  maintaining a data structure indicating for each of a plurality of volumes a threshold response time, wherein different threshold response times are provided for at least two of the volumes indicated in the data structure; and
  determining from the data structure the threshold response time for the volume indicated in the health condition message.

19. The method of claim 18, wherein the volume indicated in the health condition message comprises a first volume, wherein the swap operation is performed with respect to the first volume indicated in the health condition message to direct I/O requests for the first volume indicated to the second server, wherein prior to receiving the health condition message, I/O requests for a second volume not indicated in the health condition message are directed to the first server, wherein I/O requests to the second volume continue to be directed to the first server after completing processing the health condition message and while I/O requests are being redirected to the second server.

20. The method of claim 15, wherein the estimated I/O delay indicates a maximum expected I/O disruption time and a median or average expected I/O delay, wherein determining whether the estimated I/O delay exceeds the threshold response time comprises determining whether the maximum expected I/O disruption time exceeds the threshold response time.

21. The method of claim 20, further comprising:
  determining whether the median or average expected I/O delay exceeds an average threshold response time, wherein the swap operation is performed in response to determining that both the estimated I/O delay exceeds the threshold response time and the median or average expected I/O delay exceeds the average threshold response time.

22. A storage environment, comprising:
  a first server managing access to a first storage;
  a second server managing access to a second storage;
  a host system in communication with the first server and the second server, having a computer readable storage medium having computer readable program code that when executed performs operations, the operations comprising:
    receiving from the first server a health condition message indicating an estimated Input/Output (I/O) delay to access the first storage resulting from a health condition experienced at the first server;
    determining whether the estimated I/O delay exceeds a threshold response time for the first storage, wherein the threshold response time is based on a latency requirement to access data; and
    performing a swap operation to redirect I/O requests to data from the first server to the second server to access the data at the second storage in response to determining that the estimated I/O delay exceeds the threshold response time, wherein a swap operation is not performed in response to determining that the estimated I/O delay in the health condition message does not exceed the threshold response time for the first storage.

23. The storage environment of claim 22, wherein the health condition message includes a flag indicating whether the health condition message includes an estimated I/O delay, wherein the determining whether the estimated I/O delay exceeds the threshold response time is performed in response to determining that the flag indicating whether the estimated I/O delay is included in the health condition message.

24. The storage environment of claim 23, wherein the health condition message further includes a health status indicating one of a plurality of health status levels, wherein the operations further comprise:
   determining whether the health status indicates to perform the swap operation in response to determining that the flag indicates that the health condition message does not include the estimated I/O delay; and
   performing the swap operation in response to determining that the health status indicates to perform the swap operation.

25. The storage environment of claim 22, wherein the first server maintains a data structure indicating, for each of a plurality of health conditions, an estimated I/O delay, wherein the estimated I/O delay the first server includes in the health condition message comprises the estimated I/O delay indicated in the data structure for a health condition.

\* \* \* \* \*